(No Model.)

R. REID & J. P. BROWNE.
HOSE COUPLING.

No. 464,893.  Patented Dec. 8, 1891.

WITNESSES:
Dond Twitchell
C. Sedgwick

INVENTORS:
R. Reid
J. P. Browne
By Munn & Co.
ATTORNEYS

UNITED STATES PATENT OFFICE.

RANSOM REID AND JAMES P. BROWNE, OF SANTA ANA, CALIFORNIA.

HOSE-COUPLING.

SPECIFICATION forming part of Letters Patent No. 464,893, dated December 8, 1891.

Application filed June 24, 1891. Serial No. 397,282. (No model.)

*To all whom it may concern:*

Be it known that we, RANSOM REID and JAMES P. BROWNE, of Santa Ana, in the county of Orange and State of California, have invented a new and Improved Hose-Coupling, of which the following is a full, clear, and exact description.

The object of the invention is to provide a new and improved hose-coupling which is simple and durable in construction and permits a ready and convenient coupling and uncoupling whenever desired.

The invention consists of an exterior annular bevel formed on the male member and adapted to engage a correspondingly-shaped opening in the female member, and hooks mounted to slide on the female member and adapted to engage the back of the said bevel to draw the male member to its seat.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
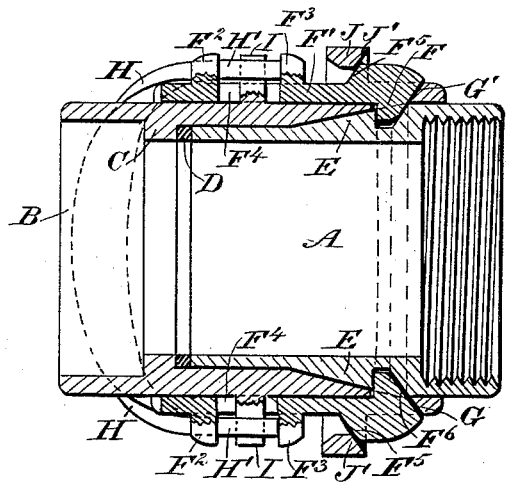
Figure 2:
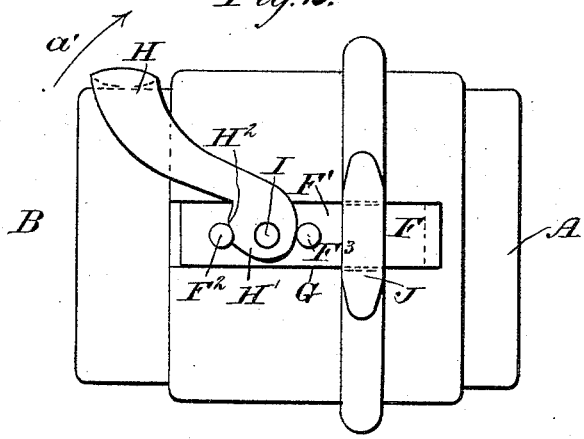
Figure 3:
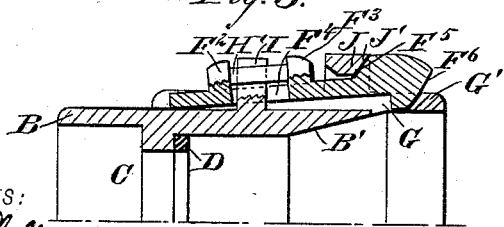

Figure 1 is a sectional plan view of the improvement. Fig. 2 is a side elevation of the same; and Fig. 3 is a sectional plan view of part of the female member, with one of the hooks in a raised position.

The improved coupling is provided with the male member A and the female member B, which latter is formed with an interior shoulder C, on which rests a gasket D, adapted to be engaged by the inner end of the male member A when the latter is fully on its seat, so as to prevent leakage. On the male member A is formed an exterior annular bevel E, adapted to engage a correspondingly-shaped opening B', formed in the outer end of the female member B. The back of the bevel E is adapted to be engaged at opposite sides by two hooks F, each of which has its shank F' fitted to slide longitudinally in a recess G, formed on the outside of the female member B. Each of the hooks F is provided on its shank with outwardly-extending lugs $F^2$ and $F^3$, between which is arranged the eccentric end H' of a U-shaped lever or handle H, pivoted at its ends on the pivots I, secured to or projecting from the female member B between the lugs $F^2$ and $F^3$. Each eccentric end H' is arranged in such a manner that by swinging the lever H forward or backward a forward or backward sliding movement is given to the two hooks simultaneously to couple or uncouple the male and female members, as hereinafter more fully described. Each of the ends H' is also formed with a notch $H^2$, adapted to engage the lug $F^2$ at the time the lever H is in its innermost position—that is, when the two members are locked in place. When the lever H is in this position, as is illustrated in Fig. 2, and the notch $H^2$ engages the lug $F^2$, then the several parts are securely locked in place.

Each hook F is formed with a longitudinal slot $F^4$, extending between the lugs $F^2$ and $F^3$, and forming a passage-way for the pivot I, which latter thus forms a guide for the sliding hooks F. Each of the latter is provided on top with a bevel $F^5$, adapted to engage a corresponding bevel J', formed on the end of a bridge J, secured or formed on the female member B, and through which passes the respective hook F. A similar bevel $F^6$ is formed on the outer end of the hook and is adapted to engage the correspondingly-shaped end G' of the guideway G, previously mentioned.

When the lever H is manipulated to move the hooks F outward by throwing the said lever in the direction of the arrow a', then the bevel $F^6$, traveling up the bevel G', disengages the hook F from the back of the bevel E, so that the male member A is unlocked from the female member B and the two members can be taken apart. When the lever H is moved in the inverse direction of the arrow a', then the two hooks F are caused to slide downward and rearward by the bevel $F^5$, striking against the bevel J' of the bridge. When the male member A has previously been inserted into the female member B, so that the hooks F pass onto the back of the bevel E, and a downward and rearward sliding motion is imparted to the said hooks, as above mentioned, then the member A is drawn inward into the female member B, until the inner end of the male member is firmly seated on the gasket D and the bevel E fits snugly into the opening B'. When the lever H is moved in its lowermost position, as shown in Fig. 2, the notch H² engages the lug F², so that the several parts are locked in place.

It will be seen that a coupling constructed in this manner is very simple and is composed of but few parts and not liable to get out of order. It will also be seen that the two members can be readily coupled or uncoupled by simply moving the lever H in the manner above described.

Having thus described our invention, we claim as new and desire to secure by Letters Patent—

1. A hose-coupling comprising two members, of which the male member is formed with an exterior annular bevel adapted to engage the correspondingly-shaped opening in the female member, and hooks mounted to slide on the female member and adapted to engage the back of the said bevel to draw the said male member to its seat, substantially as shown and described.

2. A hose-coupling comprising two members, of which the male member is formed with an exterior annular bevel adapted to engage the correspondingly-shaped opening in the female member, hooks mounted to slide on the female member and adapted to engage the back of the said bevel to draw the said male member to its seat, and means, substantially as described, for imparting a forward and backward sliding motion to the said hooks, as set forth.

3. A hose-coupling comprising two members, of which the male member is formed with an exterior annular bevel adapted to engage the correspondingly-shaped opening in the female member, hooks mounted to slide on the female member and adapted to engage the back of the said bevel to draw the said male member to its seat, lugs arranged on each of the said hooks, and a lever pivoted on the said female member and having eccentric ends extending between the lugs of the said hooks, substantially as shown and described.

4. A hose-coupling comprising two members, of which the male member is formed with an exterior annular bevel adapted to engage the correspondingly-shaped opening in the female member, hooks mounted to slide on the female member and adapted to engage the back of the said bevel to draw the said male member to its seat, lugs arranged on each of the said hooks, a lever pivoted on the said female member and having eccentric ends extending between the lugs of the said hooks, each of the said eccentric ends being formed with a notch adapted to engage one of the said lugs when the lever is in an innermost position, substantially as shown and described.

5. A hose-coupling comprising two members, of which the male member is formed with an exterior annular bevel adapted to engage the correspondingly-shaped opening in the female member, hooks mounted to slide on the female member and adapted to engage the back of the said bevel to draw the said male member to its seat, lugs arranged on each of the said hooks, a lever pivoted on the said female member and having eccentric ends extending between the lugs of the said hooks, and a bridge held on the said female member and through which passes the said hook, the said bridge being provided with a bevel engaged by a corresponding bevel on the hooks, substantially as shown and described.

RANSOM REID.
JAMES P. BROWNE.

Witnesses:
LINN L. SHAW,
JOHN R. GAMSEY.